United States Patent
Cooper et al.

(10) Patent No.: US 11,473,421 B2
(45) Date of Patent: Oct. 18, 2022

(54) MULTI-FREQUENCY ACOUSTIC INTERROGATION FOR AZIMUTHAL ORIENTATION OF DOWNHOLE TOOLS

(71) Applicant: Baker Hughes, a GE company, LLC, Houston, TX (US)

(72) Inventors: Daniel Boyd Cooper, Houston, TX (US); Matthew Thomas Raum, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 526 days.

(21) Appl. No.: 16/612,948

(22) PCT Filed: May 11, 2018

(86) PCT No.: PCT/US2018/032294
§ 371 (c)(1),
(2) Date: Nov. 12, 2019

(87) PCT Pub. No.: WO2018/209219
PCT Pub. Date: Nov. 15, 2018

(65) Prior Publication Data
US 2020/0199999 A1    Jun. 25, 2020

Related U.S. Application Data

(60) Provisional application No. 62/505,398, filed on May 12, 2017.

(51) Int. Cl.
*E21B 47/095* (2012.01)
*G01V 1/22* (2006.01)
(Continued)

(52) U.S. Cl.
CPC ............ *E21B 47/095* (2020.05); *G01V 1/226* (2013.01); *G01V 1/46* (2013.01); *G01V 1/50* (2013.01);
(Continued)

(58) Field of Classification Search
CPC ....... E21B 47/095; E21B 47/09; G01V 1/226; G01V 1/46; G01V 1/50
See application file for complete search history.

(56) References Cited

U.S. PATENT DOCUMENTS

| 8,893,785 B2 | 11/2014 | Skinner et al. |
| 9,551,809 B2 | 1/2017 | Barry et al. |

(Continued)

FOREIGN PATENT DOCUMENTS

WO    2016/126345 A1    8/2016

OTHER PUBLICATIONS

International Search Report of the International Searching Authority for PCT/US2018/032294 dated Sep. 21, 2018.

*Primary Examiner* — Ian J Lobo
(74) *Attorney, Agent, or Firm* — Cantor Colburn LLP

(57) ABSTRACT

An apparatus for detecting a location of an optical fiber having an acoustic sensor disposed subsurface to the earth includes an acoustic emitter configured to emit a first signal having a first frequency and a second signal having a second frequency that is higher than the first frequency, the first and second emitted acoustic signals being azimuthally rotated around the borehole and an optical interrogator configured to interrogate the optical fiber to receive an acoustic measurement that provides a corresponding first received signal and a corresponding second received signal. The apparatus also includes a processor configured to (i) frequency-multiply the first received signal to provide a third signal having a third frequency within a selected range of the second frequency, (Continued)

(ii) estimate a phase difference between the second received signal and the third signal, and (iii) correlate the phase difference to the location of the optical fiber.

15 Claims, 7 Drawing Sheets

(51) Int. Cl.
*G01V 1/46* (2006.01)
*G01V 1/50* (2006.01)
*E21B 43/119* (2006.01)

(52) U.S. Cl.
CPC ..... *E21B 43/119* (2013.01); *G01V 2210/1214* (2013.01); *G01V 2210/1299* (2013.01); *G01V 2210/1429* (2013.01); *G01V 2210/21* (2013.01)

(56) References Cited

U.S. PATENT DOCUMENTS

| | | |
|---|---|---|
| 2012/0013893 A1 | 1/2012 | Maida et al. |
| 2012/0111104 A1 | 5/2012 | Taverner et al. |
| 2012/0179378 A1* | 7/2012 | Duncan ................ E21B 47/008 702/8 |
| 2014/0126331 A1 | 5/2014 | Skinner |
| 2014/0167972 A1 | 6/2014 | Koste et al. |
| 2014/0208843 A1 | 7/2014 | Godfrey |
| 2016/0084074 A1 | 3/2016 | Cooper et al. |
| 2016/0223710 A1 | 8/2016 | Barry et al. |
| 2021/0032957 A1* | 2/2021 | Osborne ................ E21B 47/16 |

\* cited by examiner

MULTI-FREQUENCY ACOUSTIC INTERROGATION FOR AZIMUTHAL ORIENTATION OF DOWNHOLE TOOLS

CROSS REFERENCE TO RELATED APPLICATIONS

This application claims the benefit of U.S. Application No. 62/505,398, filed on May 12, 2017, which is incorporated herein by reference in its entirety.

BACKGROUND

Boreholes are drilled into earth formations for various purposes such as hydrocarbon production, geothermal production, and carbon dioxide sequestration. Distributed acoustic sensors embodied in an optical fiber may be disposed in a borehole such as between a casing lining the borehole and an earth formation in order to provide data useful in the utilization of the earth formation. When a casing is used, a perforation tool may be used to perforate the casing to gain access to the formation. Unfortunately, without knowledge of the azimuthal orientation of the optical fiber with respect to the perforation tool, the perforation tool may damage the optical fiber while perforating the casing. Hence, it would be well received in industries making use of the earth formations if apparatuses and methods were developed for estimating an azimuthal orientation of the optical fiber with respect to a downhole tool.

BRIEF SUMMARY

Disclosed is an apparatus for detecting a location of an optical fiber having an acoustic sensor disposed subsurface to the earth. The apparatus includes: a carrier configured to be conveyed in a borehole penetrating the earth; an acoustic emitter disposed on the carrier and configured to emit a first emitted acoustic signal having a first frequency and a second emitted acoustic signal having a second frequency that is higher than the first frequency, wherein the carrier and/or the acoustic emitter are configured such that the first and second emitted acoustic signals are azimuthally rotated around the borehole; an optical interrogator configured to interrogate the optical fiber to receive an acoustic measurement that provides a first received signal in response to the first emitted acoustic signal and a second received signal in response to the second emitted acoustic signal, the acoustic measurement being performed by the acoustic sensor at a depth within a selected range of a depth of the acoustic emitter; and a processor configured to (i) frequency-multiply the first received signal to provide a third signal having a third frequency within a selected range of the second frequency, (ii) estimate a phase difference between the second received signal and the third signal, and (iii) correlate the phase difference to the location of the optical fiber.

Also disclosed is a method for detecting a location of an optical fiber having an acoustic sensor disposed subsurface to the earth. The method includes: conveying a carrier in a borehole penetrating the earth; emitting a first emitted acoustic signal having a first frequency and a second emitted acoustic signal having a second frequency that is higher than the first frequency using an acoustic emitter disposed on the carrier, wherein the first and second emitted acoustic signals are azimuthally rotated around the borehole; interrogating the optical fiber using an optical interrogator to measure a first received signal in response to the first emitted acoustic signal and a second received signal in response to the second emitted acoustic signal, the first and second received signals being received by the acoustic sensor at a depth within a selected range of a depth of the acoustic emitter; frequency-multiplying the first received signal to provide a third signal having a third frequency within a selected range of the second frequency using a processor; estimating a phase difference between the second received signal and the third signal using the processor; and correlating the phase difference to the location of the optical fiber using the processor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are embodiments of apparatuses and methods for estimating an azimuthal orientation of a downhole optical fiber embodying distributed acoustic sensors with respect to a downhole tool. In one or more embodiments, a directional acoustic emitter disposed in a borehole emits two or more acoustic signals simultaneously, each acoustic signal having a different frequency. The directional acoustic emitter may be disposed on the downhole tool and is azimuthally rotated within the borehole. The acoustic signals are received by the distributed sensors at the depth of the acoustic emitter. Using signal processing techniques discussed further below, a phase shift in the received signals is measured for various azimuthal directions and correlated to the azimuthal orientation of the optical fiber with respect to the downhole tool.

Figure 1:
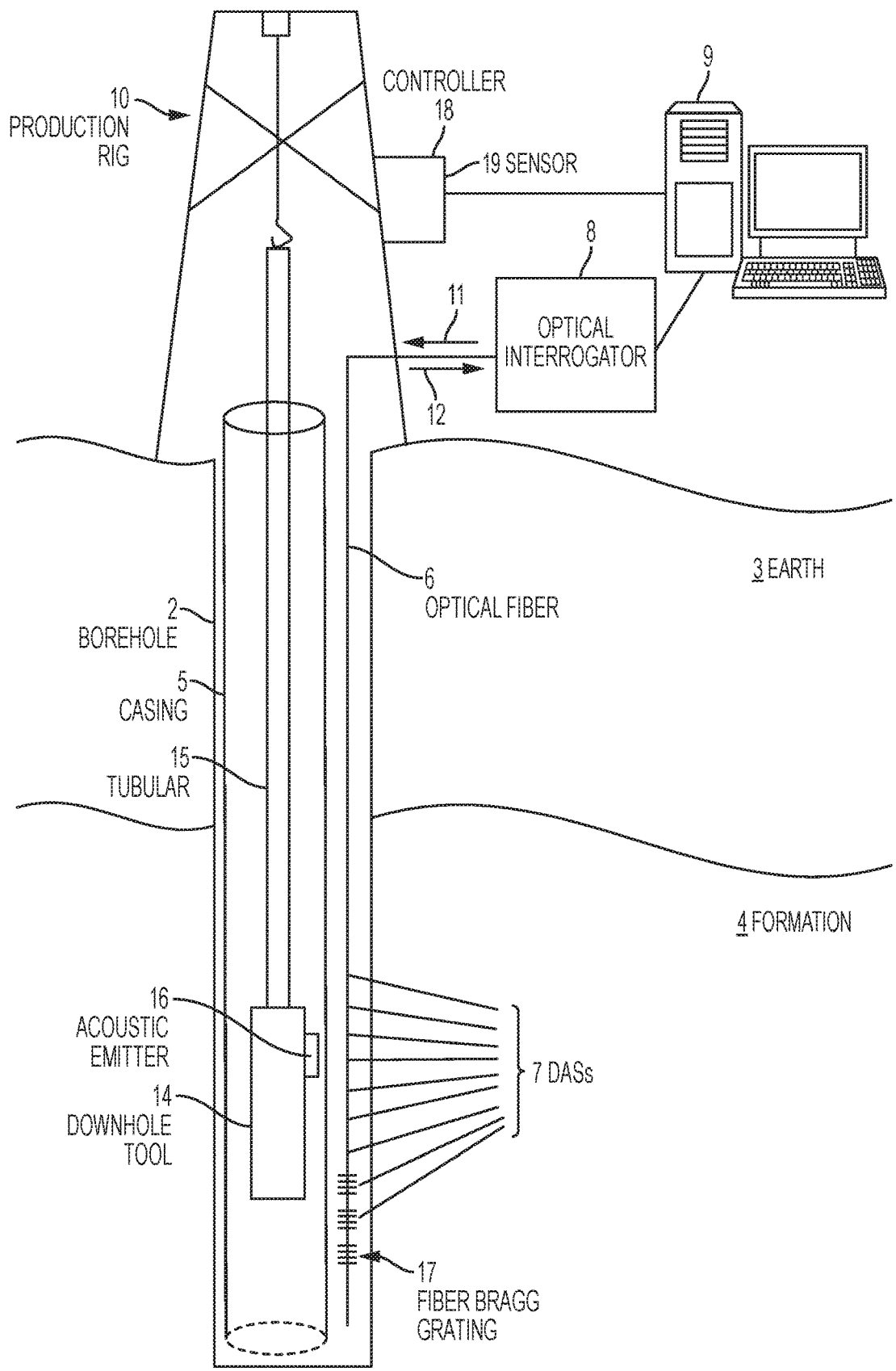
FIG. 1 is a cross-sectional view of an embodiment of a borehole penetrating the earth.

FIG. 1 illustrates a cross-sectional view of a borehole 2 penetrating the earth 3 having a formation 4. The borehole 2 is lined with a casing 5 that may be cemented in place. An optical fiber 6 having distributed acoustic sensors (DASs) 7 is disposed on casing 5 internal to and/or external to the casing 5. The DASs 7 may be embodied in the optical properties of the optical fiber 6 (e.g., without further preparation of the optical fiber to instill the optical properties) and interrogated such as by Rayleigh scattering or by using a series of distinct changes in the index of refraction of the optical fiber 6 such as implemented by fiber Bragg gratings 17. The DASs 7 are configured to interact with received acoustic signals to sense or measure an amplitude or intensity of the received acoustic signals over time in conjunction with an optical interrogator 8.

The optical interrogator 8 is in optical communication with the optical fiber 6. The optical interrogator 8 is configured to read the DASs 7 at locations along the optical fiber 6. Reading each DAS 7 includes measuring an amplitude and determining a corresponding location along the optical fiber 6 of the reading. In order to read the DASs 7 along the optical fiber 6, the optical interrogator 8 is configured to transmit input light 11 into the optical fiber 6 such as by using a laser (not shown) and to receive backscatterd or reflected light 12 such as by using a photodetector (not shown). The transmitted input light 11 and the reflected light 12 are transmitted and processed in accordance with any of the methods known in the art such as Optical Time Domain Reflectometry (OTDR). Other methods may include Optical Frequency Domain Reflectometry (OFDR), Incoherent Optical Frequency Domain Reflectometry (IOFDR), or broadband reflectometry with frequency-domain multiplexing in non-limiting embodiments. In that various apparatuses and methods for reading the DASs 7 are known in the art, they are not discussed in further detail. Readings of one or more DASs may be transmitted to a computer processing system 9 for processing to determine the orientation of the optical fiber 6.

FIG. 1 also illustrates a production rig 10. The production rig 10 is configured to perform various production and/or completion actions for utilization of the earth formation 4. In one or more embodiments, the production rig 10 is configured to operate a downhole tool 14. In one or more embodiments the downhole tool 14 is carried by a tubular 15 that may be lowered, raised and/or rotated. In one or more embodiments, a directional acoustic emitter 16, such as an electrical/acoustic transducer, is disposed on the downhole tool 14. The term "directional" relates to the acoustic emitter not having an acoustic output that is uniformly distributed for 360° around the borehole 2. It can be appreciated that narrowing the range may provide for increased accuracy in estimating the azimuthal direction of the optical fiber. The acoustic emitter 16 may be azimuthally rotated physically with respect with respect to the borehole by rotating the tubular 15 or by rotating the acoustic emitter itself. In one or more embodiments, the acoustic output may be azimuthally rotated around the borehole using a phased array of acoustic emitters without the phased array of acoustic emitters being physically rotated with respect to the borehole. In one or more embodiments, the acoustic output may be rotated continuously 360° around the borehole 2 or in discrete steps. Corresponding readings of one or more DASs may be continuous or in discrete steps. The production rig 10 may include a controller 18 for controlling operation the downhole tool 14 based upon the determined orientation of the optical fiber. The production rig 10 may include a sensor 19 for sensing azimuthal orientation of the acoustic emitter 16. In one or more embodiments, the azimuthal orientation of the acoustic emitter 16 may be sensed by sensing an azimuthal orientation of the carrier or tubular that carries the acoustic emitter 16.

Figure 2:
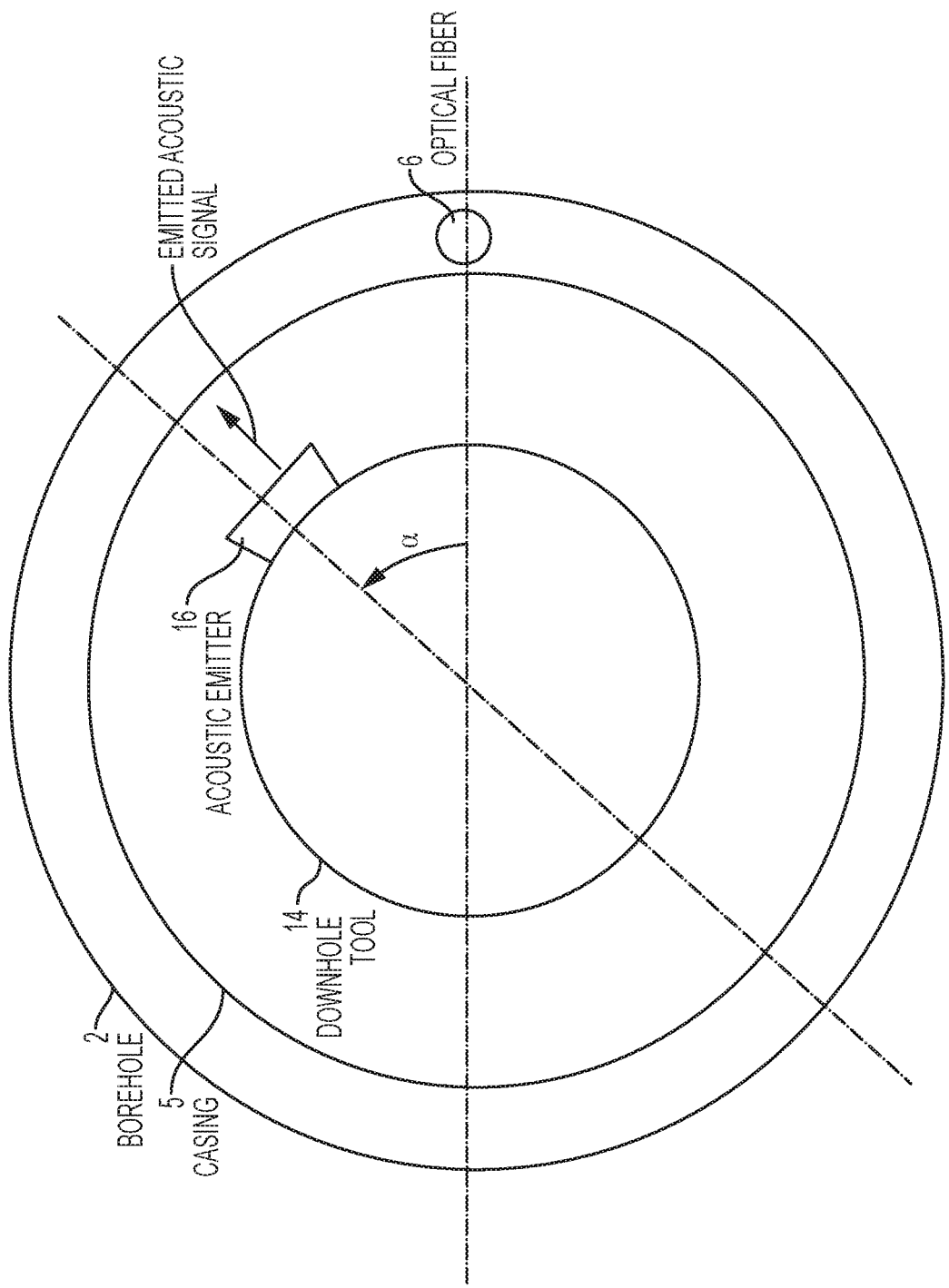
FIG. 2 is a top view of the borehole illustrating an optical fiber having distributed acoustic sensors.

FIG. 2 is a top view of the borehole illustrating the optical fiber 6 having the DASs 7 with respect to the borehole 2 and casing 5. FIG. 2 illustrates an example of an azimuthal measurement a for estimating a location or orientation of the optical fiber 6 with respect to a reference such as the azimuth of the acoustic emitter 16.

With reference to FIG. 1, one of the acoustic sensors 7 can receive and measure an acoustic signal emitted by the acoustic emitter 16 at a depth within a selected range of the depth of the acoustic emitter 16. In one or more embodiments, the selected acoustic sensor in the DASs 7 for receiving the acoustic signal is the acoustic sensor that is at a depth closest to the depth of the acoustic emitter 16.

Figure 3:
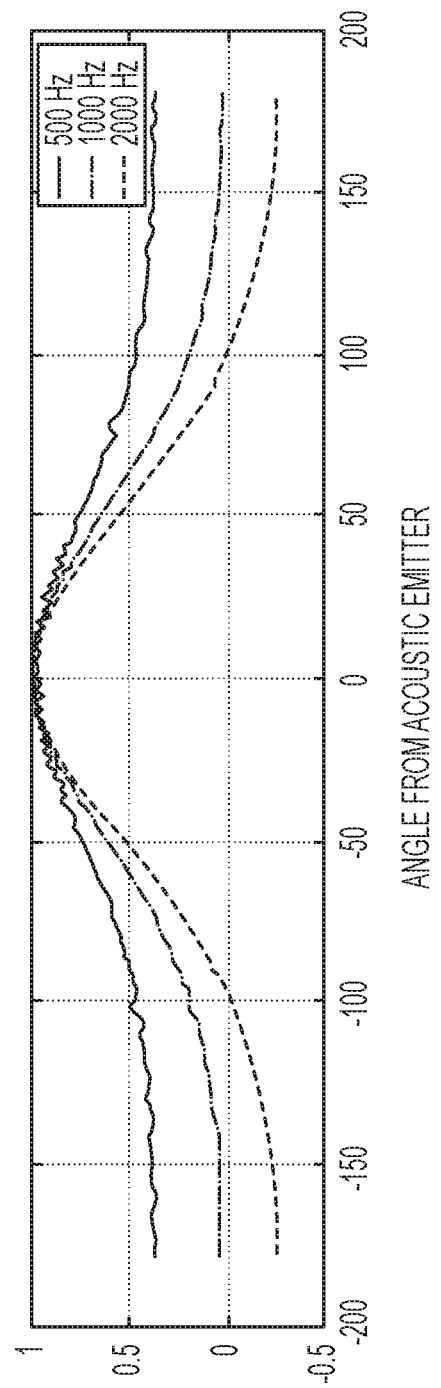
FIG. 3 depicts aspects of acoustic intensity as a function of position around the borehole for several specific frequencies.

FIG. 3 depicts aspects of acoustic intensity as a function of position around the borehole for emitted acoustic signals of 500 Hz, 1000 Hz and 2000 Hz. Specifically, FIG. 3 illustrates distribution of acoustic energy with respect to angle from the acoustic emitter for the three frequencies. It is noted that at lower frequencies (e.g., less than 1000 Hz) the acoustic energy is more or less distributed over the entirety of the wellbore. This distribution becomes increasing even as the frequency of the acoustic energy decreases. Further, at sufficiently high frequencies, the acoustic energy present at locations opposite the emitter becomes 180° out of phase with respect to the acoustic emitter. If the acoustic emitter is set up to transmit at two frequencies, one where the phase relationship of acoustic energy to the emitter is constant with respect to angle (as is the case at 500 Hz in FIG. 3), and another where acoustic energy away from the emitter has reversed phase (as is the case at 2000 Hz in FIG. 3), then orientation of the acoustic emitter with respect to the acoustic sensor may be determined by examination of the phase of acoustic measurements obtained at the higher frequency with reversing phase.

Figure 4A:
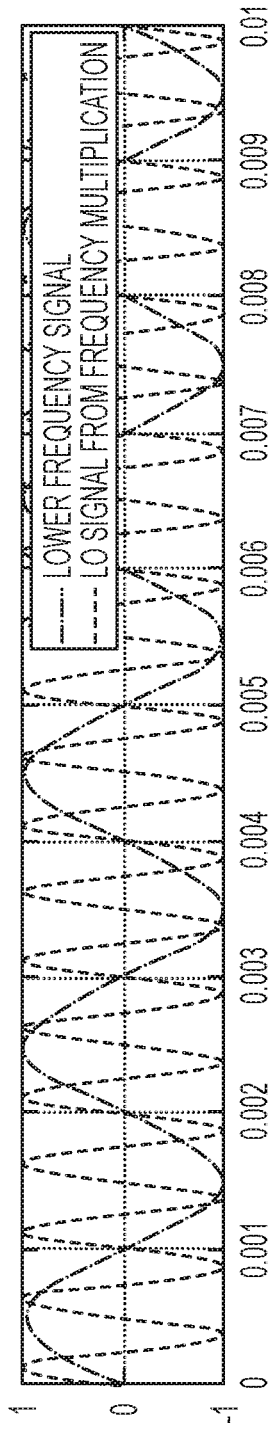
FIGS. 4A-4C, collectively referred to as FIG. 4, depict aspects of low and high frequency emitted signals, detected signals, and demodulation of the detected signals to estimate an azimuthal orientation of a downhole tool disposed in the borehole.
Figure 4B:
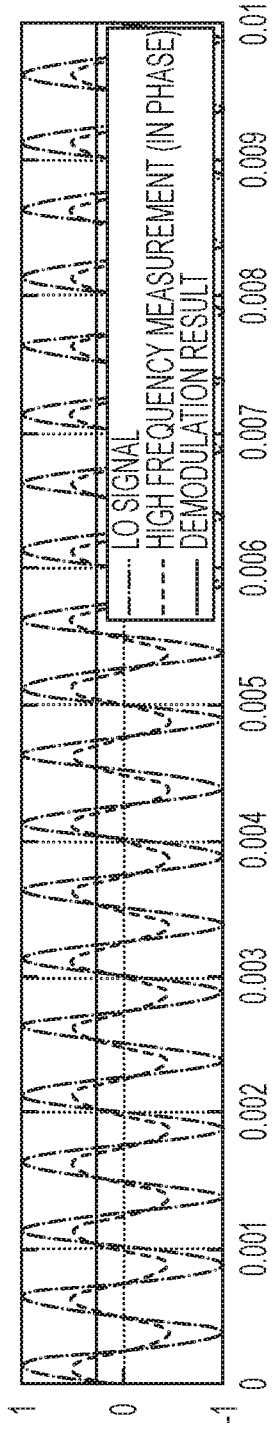
Figure 4C:
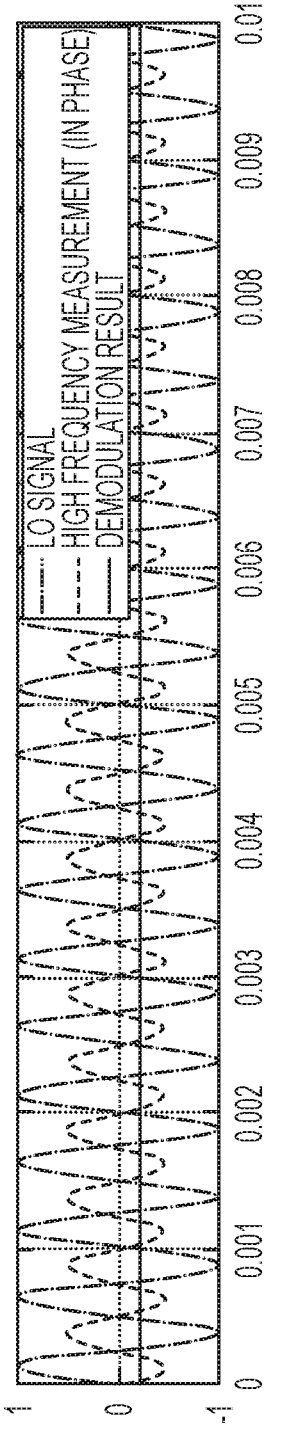

This of course, requires that the phase of the measurements obtained at the higher frequency be compared to the phase of the emitter. This can be done if the two frequencies selected have an integer relationship in frequency (for example, 2000 Hz is 4×500 Hz). In this case, measurements obtained at the lower frequency (which has the same phase as the emitter regardless of orientation) can be frequency-multiplied to create a reference signal for demodulation of the result at the higher frequency. In other words, frequency-multiplication of the lower frequency measurement can be used to generate the equivalent of a local oscillator. This frequency-multiplied output can then be used to apply product detection (or an equivalent technique) to the measurement obtained at the higher frequency, allowing the extraction of phase information. Note that measurements at both frequencies may be obtained using the same sensing system, and separated via spectral filtering or an equivalent technique. Example waveforms of such an approach are shown in FIG. 4. In one or more embodiments, approximate orientation may be determined solely from the sign of the demodulation result to provide a robust detection result. FIG. 4A illustrates production of a local oscillator (LO) signal from the measured low frequency signal via frequency-multiplication. FIG. 4B illustrates an example of when a measurement of the high frequency measured acoustic signal is in phase with the LO signal and a result of demodulation of the measured acoustic signal and the LO signal. The two signals will be in phase when the acoustic emitter is in line with acoustic sensor measuring the high frequency emitted acoustic signal. FIG. 4C illustrates an example of when a measurement of the high frequency measured acoustic signal is 180° out-of-phase with the LO signal and a result of demodulation of the measured reverse-phase acoustic signal and the LO signal. Hence, it can be seen in FIGS. 4B and 4C that the demodulation result provides an indication of the phase difference between the high frequency measured acoustic signal and the LO signal. The phase difference can then be correlated to the orientation of the optical fiber. In one or more embodiments, the orientation of the optical fiber is with respect to the acoustic emitter such that zero phase angle indicates that the acoustic emitter is pointed directly to the acoustic sensor doing the sensing of the emitted acoustic signal and a 180° phase angle indicates that the acoustic emitter is pointing directly away from the acoustic sensor. Phase angles between 0° and 180° can be correlated to angles of the acoustic emitter between these two angles. Correlations can be developed using analysis and/or testing based on the technical specifications of the downhole components being used and the geometry of the borehole and casing.

Figure 5:
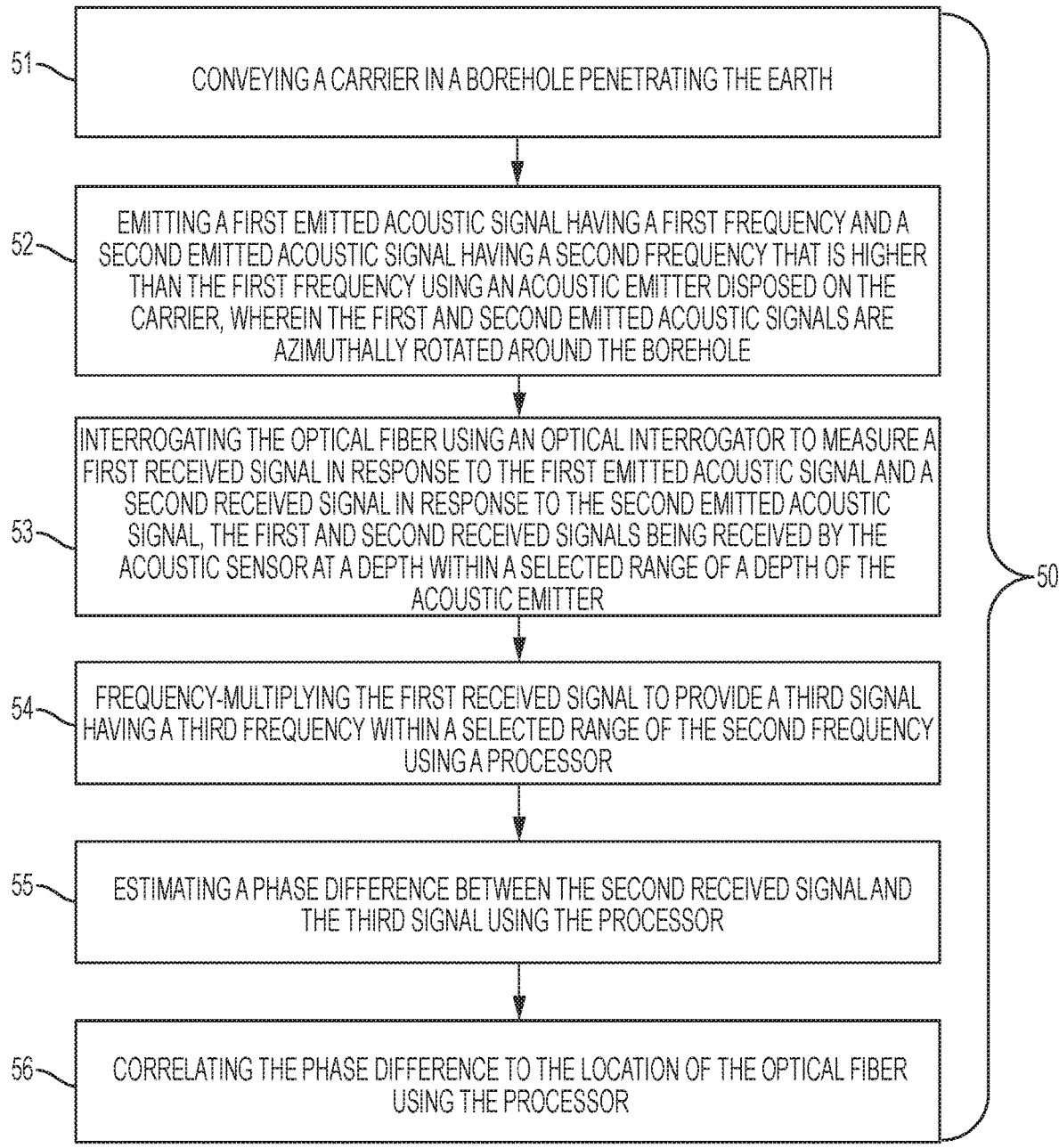
FIG. 5 is a flow chart for a method for estimating an azimuthal orientation of the downhole tool with respect to the optical fiber having distributed acoustic sensors

FIG. 5 is a flow chart for a method 50 for estimating an azimuthal orientation of the optical fiber having distributed acoustic sensors. Block 51 calls for conveying a carrier in a borehole penetrating the earth. The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Block 52 calls for emitting a first emitted acoustic signal having a first frequency and a second emitted acoustic signal having a second frequency that is higher than the first frequency using an acoustic emitter disposed on the carrier, wherein the first and second emitted acoustic signals are azimuthally rotated around the borehole. In one or more embodiments, this acoustic emitter emits sound consisting of at least two discrete frequencies. In one or more embodiments, the second frequency is an integer multiple of the first frequency. These frequencies are not chosen arbitrarily; rather they are selected so as to excite selected vibration modes of the casing and surrounding structures (cement, formation, etc.). The frequencies separating these modes can be identified by interrogating the formation with an acoustic emission of constant amplitude and chirped frequency. The purpose of applying acoustic emissions at frequencies corresponding to different modes is that the vibration mode shape associated with each individual mode is distinct. Therefore, as the acoustic source is rotated, the acoustic energy obtained at each frequency shows a distinct distribution with respect to the angle between the acoustic source and the optical cable being used to obtain DAS measurements, based upon the frequency of acoustic emissions. This allows the azimuthal orientation of the optical cable to be identified by examining the ratios of acoustic energy received at different frequencies. In one or more embodiments, the first and second emitted acoustic signals are azimuthally rotated continuously around the borehole. In one or more embodiments, the first and second emitted acoustic signals are azimuthally rotated in discrete steps around the borehole. The angle of each discrete step may be dependent on a desired minimum resolution for detection of the orientation of the optical fiber.

Figure 6:
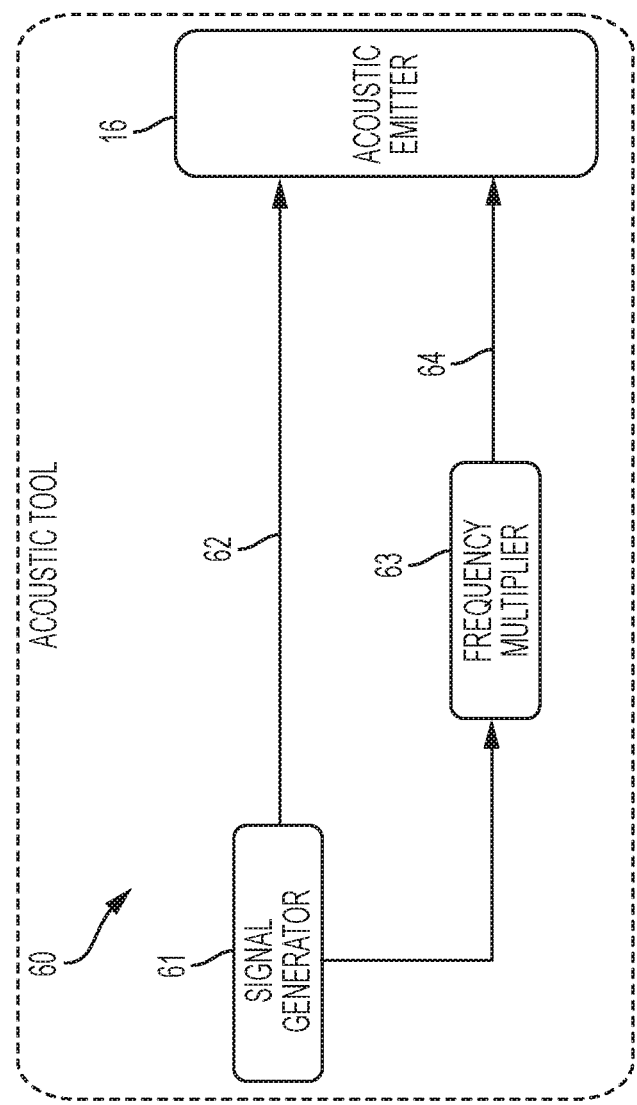
FIG. 6 depicts aspects of operation of an acoustic source.

FIG. 6 depicts aspects of an embodiment of a downhole acoustic source 60. In this embodiment, a signal generator 61 is configured to emit a first electrical signal 62 having a low or reference frequency such as 500 Hz or lower in a non-limiting embodiment. The first electrical signal 62 is transmitted to the acoustic emitter 16. A frequency-multiplier 63 is configured to multiply the frequency of the first electrical signal 62 provide a second electrical signal 64 having a higher frequency than the first electrical signal 62. In one or more embodiments, the frequency of the first electrical signal 62 is multiplied by an integer value such as 4 or 5 in a non-limiting embodiment. The second electrical signal 64 is also transmitted to the acoustic emitter 16 such that the acoustic emitter 16 will simultaneously emit both acoustic tones. Further, in other embodiments, two separate acoustic emitters may be used. If two acoustic emitters are used, then these acoustic emitters do not necessarily need to be collocated, since the phase relationship between acoustic measurements at the lower frequency and the emitter is not dependent upon the azimuthal positioning of the acoustic sensor relative to the emitter.

Referring to FIG. 5, block 53 calls for interrogating the optical fiber using an optical interrogator to measure a first received signal in response to the first emitted acoustic signal and a second received signal in response to the second emitted acoustic signal, the first and second received signals being received by the acoustic sensor at a depth within a selected range of a depth of the acoustic emitter. In one or more embodiments, the depth of the acoustic sensor being interrogated is at a depth closest to the depth of the acoustic emitter. Block 54 calls for frequency-multiplying the first received signal to provide a third signal having a third frequency within a selected range of the second frequency using a processor. The third signal is equivalent to the LO signal discussed above. In one or more embodiments, the third frequency is the same as the second frequency or within 1% of the second frequency for example. Block 55 calls for estimating a phase difference between the second received signal and the third signal using the processor. In one or more embodiments, the phase difference is estimated by demodulating a product of the second received signal and the third signal. Block 56 calls for correlating the phase difference to the location of the optical fiber using the processor. The method 50 may also include performing an action downhole based on the location of the optical fiber using a downhole tool. A non-limiting embodiment of the action is perforating the casing using a perforation tool.

Figure 7:
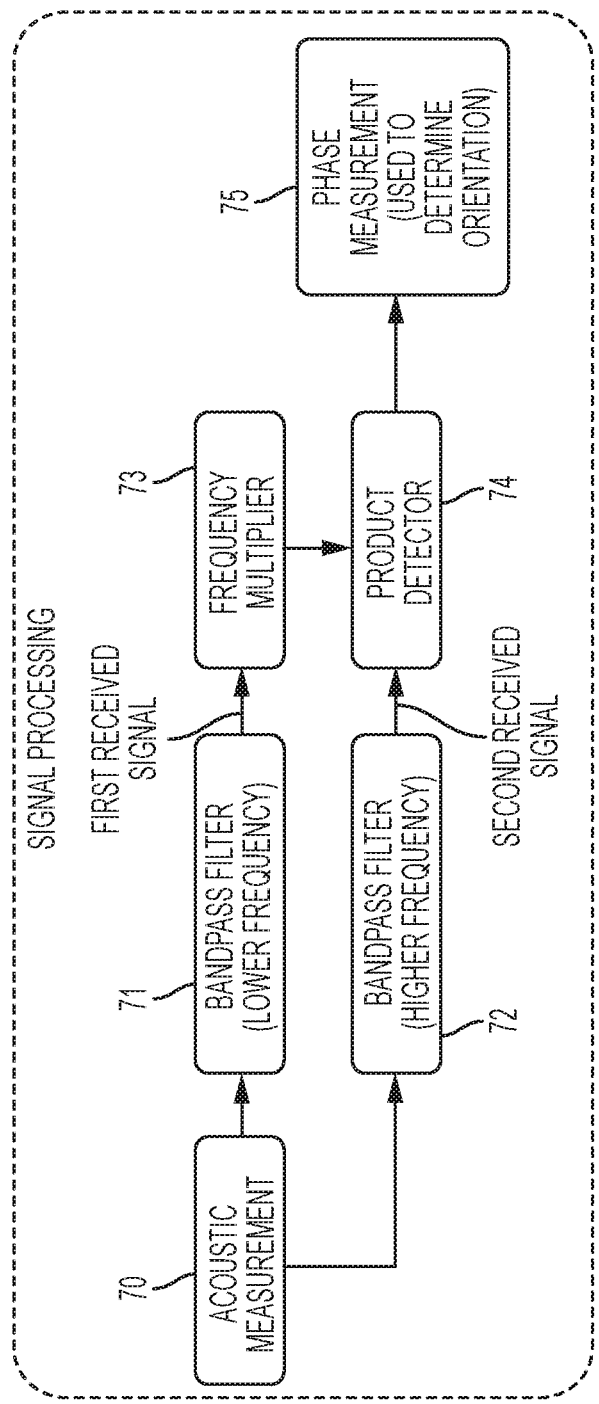
FIG. 7 depicts aspects of signal processing for estimating the azimuthal orientation.

FIG. 7 depicts aspects of signal processing using an acoustic measurement. At 70, an acoustic measurement is made using one of the distributed acoustic sensors implemented by the optical fiber. A first bandpass filter 71 is configured to filter the acoustic measurement to allow the first received signal having the first frequency to pass and exclude the second received signal having the second frequency. A second bandpass filter 72 is configured to allow the second received signal to pass and exclude the first received signal. A frequency-multiplier 73 is configured to frequency-multiply the first received signal to provide the third signal (i.e., the LO signal) having the third frequency. In general, the third frequency may be the same as the second frequency or close to the second frequency. A product detector or demodulator 74 is configured to demodulate a product of the second received signal and the third signal to provide a phase measurement or phase difference between the second received signal and the third signal. Once the phase difference is estimated, then a processor such as the computer processing system 9 can correlate the phase difference to the orientation of the optical fiber using a reference correlation. It can be appreciated that the term "processor" may relate to a digital processor such as in a computer processing system and/or a dedicated analog processor (using analog signals) that is implemented by active and/or passive electronic components.

The disclosure herein provides several advantages. One advantage is that over prior art orientation tools such as a magnetic orientation tool (MOT). In the prior art, large blast protectors (manufactured out of steel or another ferrous metal) are placed around the fiber optic cable. These serve to distort the Earth's magnetic field in the azimuthal direction of the fiber optic cable, thereby allowing the MOT to determine the orientation of the fiber optic cable relative to Earth's magnetic field. This then allows the perforation tool to be oriented in the desired direction, by orienting it to the desired direction relative to Earth's magnetic field. However, there are several limitations associated with this approach. Firstly, there is significant expense associated with the aforementioned blast protectors; this can represent a substantial portion of the cost required to instrument a well. Additionally, MOTs are very limited in their ability to operate reliability at high temperature (>200° C.); this is a severe difficulty associated with the instrumentation of high temperature wells. It is notable that one of the main advantages of the fiber optic instrumentation as disclosed herein (relative to equivalent electrical instrumentation in the MOT) is its ability to operate with superior reliability in such high temperature environments.

Another advantage is the disclosure herein uses at least two separate frequencies for emission of acoustic energy as opposed to one based upon the emission of acoustic energy at a single frequency. Most notable is that this enables a scheme where measurements can be derived from phase information, rather than amplitude information. Measurements derived from phase or frequency information are generally substantially more robust than those obtained from amplitude information, as there are many more effects which can modify or corrupt amplitude information than phase/frequency information.

Set forth below are some embodiments of the foregoing disclosure:

Embodiment 1

An apparatus for detecting a location of an optical fiber having an acoustic sensor disposed subsurface to the earth, the apparatus comprising: a carrier configured to be conveyed in a borehole penetrating the earth; an acoustic emitter disposed on the carrier and configured to emit a first emitted acoustic signal having a first frequency and a second emitted acoustic signal having a second frequency that is higher than the first frequency, wherein the carrier and/or the acoustic emitter are configured such that the first and second emitted acoustic signals are azimuthally rotated around the borehole; an optical interrogator configured to interrogate the optical fiber to receive an acoustic measurement that provides a first received signal in response to the first emitted acoustic signal and a second received signal in response to the second emitted acoustic signal, the acoustic measurement being performed by the acoustic sensor at a depth within a selected range of a depth of the acoustic emitter; and a processor configured to (i) frequency-multiply the first received signal to provide a third signal having a third frequency within a selected range of the second frequency, (ii) estimate a phase difference between the second received signal and the third signal, and (iii) correlate the phase difference to the location of the optical fiber.

Embodiment 2

The apparatus according to claim 1, further comprising a display configured to display the location to a user.

Embodiment 3

The apparatus according to claim 1, wherein the carrier and/or the acoustic emitter are configured such that the first and second emitted acoustic signals are azimuthally rotated continuously around the borehole.

Embodiment 4

The apparatus according to claim 1, wherein the carrier and/or the acoustic emitter are configured such that the first and second emitted acoustic signals are azimuthally rotated in discrete steps around the borehole.

Embodiment 5

The apparatus according to claim 1, further comprising: a signal generator configured to generate a first electrical signal at the first frequency; and a frequency multiplier configured to multiply the first frequency of the first electrical signal to provide a second electrical signal at the second frequency; wherein the first electrical signal and the second electrical signal are provided to the acoustic emitter.

Embodiment 6

The apparatus according to claim 1, wherein the second frequency is an integer multiple of the first frequency.

Embodiment 7

The apparatus according to claim 1, wherein the third frequency is the same as the second frequency.

Embodiment 8

The apparatus according to claim 1, further comprising: a first filter configured to filter an acoustic measurement made by the acoustic sensor to pass the first received signal and exclude the second received signal; a second filter configured filter the acoustic measurement to pass the second received signal and exclude the first received signal; a frequency-multiplier configured to multiply the frequency of the first received signal passing through the first filter to provide the third signal; a demodulator configured to demodulate a product of the third signal and the second received signal that passes through the second filter in order to estimate the phase difference.

Embodiment 9

The apparatus according to claim 1, further comprising a downhole tool configured to perform an action using the location of the optical fiber.

Embodiment 10

The apparatus according to claim 9, wherein the downhole tool comprises a perforation tool configured to perforate a casing lining the borehole at a selected location that is not the location of the optical fiber.

Embodiment 11

The apparatus according to claim 1, wherein the carrier is configured to rotate in order to azimuthally rotate the acoustic emitter.

Embodiment 12

A method for detecting a location of an optical fiber having an acoustic sensor disposed subsurface to the earth, the method comprising: conveying a carrier in a borehole penetrating the earth; emitting a first emitted acoustic signal having a first frequency and a second emitted acoustic signal having a second frequency that is higher than the first frequency using an acoustic emitter disposed on the carrier, wherein the first and second emitted acoustic signals are azimuthally rotated around the borehole; interrogating the optical fiber using an optical interrogator to measure a first received signal in response to the first emitted acoustic signal and a second received signal in response to the second emitted acoustic signal, the first and second received signals being received by the acoustic sensor at a depth within a selected range of a depth of the acoustic emitter; frequency-multiplying the first received signal to provide a third signal having a third frequency within a selected range of the second frequency using a processor; estimating a phase difference between the second received signal and the third signal using the processor; and correlating the phase difference to the location of the optical fiber using the processor.

Embodiment 13

The method according to claim 12, displaying the location to a user using a display.

Embodiment 14

The method according to claim 12, wherein the first and second emitted acoustic signals are azimuthally rotated continuously around the borehole.

Embodiment 15

The method according to claim 12, wherein the first and second emitted acoustic signals are azimuthally rotated in discrete steps around the borehole.

Embodiment 16

The method according to claim 12, further comprising: using a signal generator to generate a first electrical signal at the first frequency and transmitting the first electrical signal to the acoustic emitter to emit the first emitted acoustic signal; and using a frequency-multiplier to frequency-multiply the first electrical signal to provide a second electrical signal at the second frequency and transmitting the second electrical signal to the acoustic emitter to emit the second emitted acoustic signal.

Embodiment 17

The method according to claim 12, further comprising: filtering the acoustic measurement to pass the first received signal and exclude the second received signal; and filtering the acoustic measurement to pass the second received signal and exclude the first received signal.

Embodiment 18

The method according to claim 12, wherein estimating a phase difference comprises demodulating a product of the second received signal and the third signal.

Embodiment 19

The method according to claim 12, wherein the first and second frequencies excite a vibration mode of a downhole structure.

Embodiment 20

The method according to claim 12, further comprising performing an action downhole based on the location of the optical fiber using a downhole tool.

In support of the teachings herein, various analysis components may be used, including a digital and/or an analog system. For example, the optical interrogator 8, the computer processing system 9, the controller 18, or the sensor 19 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first," "second" and the like are used to differentiate elements and are not intended to denote a particular order.

The flow diagram depicted herein is just an example. There may be many variations to this diagram or the steps (or operations) described therein without departing from the spirit of the invention. For example other operations such as cooling may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for detecting a location of an optical fiber (6) having an acoustic sensor disposed subsurface to the earth, the apparatus characterized by:
    a carrier configured to be conveyed in a borehole (2) penetrating the earth;
    an acoustic emitter (16) disposed on the carrier and configured to emit a first emitted acoustic signal having a first frequency and a second emitted acoustic signal having a second frequency that is higher than the first frequency, wherein the carrier and/or the acoustic emitter (16) are configured such that the first and second emitted acoustic signals are azimuthally rotated around the borehole (2);
    an optical interrogator (8) configured to interrogate the optical fiber (6) to receive an acoustic measurement that provides a first received signal in response to the first emitted acoustic signal and a second received signal in response to the second emitted acoustic signal, the acoustic measurement being performed by the acoustic sensor at a depth within a selected range of a depth of the acoustic emitter (16); and
    a processor configured to (i) frequency-multiply the first received signal to provide a third signal having a third frequency within a selected range of the second frequency, (ii) estimate a phase difference between the second received signal and the third signal, and (iii) correlate the phase difference to the location of the optical fiber (6).

2. The apparatus according to claim 1, further comprising a display configured to display the location to a user.

3. The apparatus according to claim 1, wherein the carrier and/or the acoustic emitter (16) are configured such that the first and second emitted acoustic signals are azimuthally rotated continuously around the borehole (2).

4. The apparatus according to claim 1, wherein the carrier and/or the acoustic emitter (16) are configured such that the first and second emitted acoustic signals are azimuthally rotated in discrete steps around the borehole (2).

5. The apparatus according to claim 1, further comprising:
    a signal generator (61) configured to generate a first electrical signal (62) at the first frequency; and
    a frequency multiplier configured to multiply the first frequency of the first electrical signal (62) to provide a second electrical signal (64) at the second frequency;
    wherein the first electrical signal (62) and the second electrical signal (64) are provided to the acoustic emitter (16).

6. The apparatus according to claim 1, wherein the second frequency is an integer multiple of the first frequency.

7. The apparatus according to claim 1, wherein the third frequency is the same as the second frequency.

8. The apparatus according to claim 1, further comprising:
    a first filter configured to filter an acoustic measurement made by the acoustic sensor to pass the first received signal and exclude the second received signal;
    a second filter configured filter the acoustic measurement to pass the second received signal and exclude the first received signal;
    a frequency-multiplier (63) configured to multiply the frequency of the first received signal passing through the first filter to provide the third signal;
    a demodulator configured to demodulate a product of the third signal and the second received signal that passes through the second filter in order to estimate the phase difference.

9. The apparatus according to claim 1, further comprising a downhole tool (14) configured to perform an action using the location of the optical fiber (6).

10. The apparatus according to claim 9, wherein the downhole tool (14) comprises a perforation tool configured to perforate a casing (5) lining the borehole (2) at a selected location that is not the location of the optical fiber (6).

11. The apparatus according to claim 1, wherein the carrier is configured to rotate in order to azimuthally rotate the acoustic emitter (16).

12. A method (50) for detecting a location of an optical fiber (6) having an acoustic sensor disposed subsurface to the earth, the method (50) characterized by:
    conveying a carrier in a borehole (2) penetrating the earth;
    emitting a first emitted acoustic signal having a first frequency and a second emitted acoustic signal having a second frequency that is higher than the first frequency using an acoustic emitter (16) disposed on the carrier, wherein the first and second emitted acoustic signals are azimuthally rotated around the borehole (2);
    interrogating the optical fiber (6) using an optical interrogator (8) to measure a first received signal in response to the first emitted acoustic signal and a second received signal in response to the second emitted acoustic signal, the first and second received signals being received by the acoustic sensor at a depth within a selected range of a depth of the acoustic emitter (16);
    frequency-multiplying the first received signal to provide a third signal having a third frequency within a selected range of the second frequency using a processor;
    estimating a phase difference between the second received signal and the third signal using the processor; and
    correlating the phase difference to the location of the optical fiber (6) using the processor.

13. The method (50) according to claim 12, further comprising:
    using a signal generator (61) to generate a first electrical signal (62) at the first frequency and transmitting the first electrical signal (62) to the acoustic emitter (16) to emit the first emitted acoustic signal; and
    using a frequency-multiplier (63) to frequency-multiply the first electrical signal (62) to provide a second electrical signal (64) at the second frequency and transmitting the second electrical signal (64) to the acoustic emitter (16) to emit the second emitted acoustic signal.

14. The method (50) according to claim 12, further comprising:

filtering the acoustic measurement to pass the first received signal and exclude the second received signal; and filtering the acoustic measurement to pass the second received signal and exclude the first received signal.

15. The method (50) according to claim 12, wherein the first and second frequencies excite a vibration mode of a downhole structure.

* * * * *